United States Patent [19]

Gilsdorf et al.

[11] 3,844,647
[45] Oct. 29, 1974

[54] PICTURE DISPLAY APPARATUS

[75] Inventors: Richard C. Gilsdorf, Duarte; Stanley D. Tout, Arcadia, both of Calif.

[73] Assignee: Bell & Howell Company, Chicago, Ill.

[22] Filed: Jan. 8, 1973

[21] Appl. No.: 322,057

[52] U.S. Cl. ............................................. 353/101
[51] Int. Cl. ........................................... G03b 3/02
[58] Field of Search ................... 353/100, 101, 122

[56] References Cited
UNITED STATES PATENTS
3,475,091  10/1969  Smitzer ............................... 353/101

FOREIGN PATENTS OR APPLICATIONS
1,180,178  2/1970  Great Britain ...................... 353/101

Primary Examiner—Louis R. Prince
Assistant Examiner—A. J. Mirabito
Attorney, Agent, or Firm—Benoit Law Corporation

[57] ABSTRACT

Apparatus for selectively displaying a first picture having a first format and a second picture having a second format include equipment for projecting either of the first and second pictures, and equipment for selectively positioning the first and second pictures, respectively, in a first picture position and in a second picture position angularly displaced relative to said first picture position in an optical path of the projecting means. This apparatus further includes equipment for adapting the projecting equipment automatically to a display of the first picture in response to the positioning of the first picture in the first picture position and automatically to a display of the second picture in response to the positioning of the second picture in the angularly displaced second picture position. To this end, the picture positioning equipment is rotatable and the projecting equipment is translatorily movable in response to rotation of the picture positioning equipment.

6 Claims, 5 Drawing Figures

PATENTED OCT 29 1974 3,844,647

PICTURE DISPLAY APPARATUS

BACKGROUND OF THE INVENTION

1. Field of the Invention

The subject invention relates to optical equipment and, more particularly, to apparatus for displaying pictures and film viewing equipment.

2. Description of the Prior Art

Prior-art equipment for displaying or viewing pictures having different formats typically required manual adjustments which have depended on the skill and discernment of the operator.

Automated focusing equipment for adapting display or viewing systems to different film formats would have been too complex for simple types of equipment.

SUMMARY OF THE INVENTION

It is an object of this invention to overcome the above mentioned disadvantages.

It is an object of this invention to provide improved picture display and viewing equipment for use with different picture formats.

It is an object of this invention to provide equipment of the latter type in which the adaptation of optical means to different picture formats is effected automatically.

It is a related object of this invention to eliminate reliance on the operator's visual discernment in the adaptation of picture display and viewing equipment to different picture formats.

Other objects of this invention will become apparent in the further course of this disclosure.

From a first aspect thereof, the subject invention resides in apparatus for selectively displaying a first picture having a first format and a second picture having a second format, comprising, in combination, first means including lens means for projecting either of the first and second pictures and means for rendering said lens means translatorily movable along an axis in an optical path through said lens means, second means for selectively positioning the first and second pictures respectively, in a first picture position and in a second picture position angularly displaced relative to said first picture position in the mentioned optical path, third means for rendering the second means rotatable about the mentioned axis, and fourth means coupled to the lens means and to the second means for effecting translatory movement of said lens means in response to rotary movement of said second means, said fourth means including means for automatically positioning the lens means in a first lens means position for a display of the first picture with said first format in response to the positioning of the first picture in the first picture position and for automatically positioning the lens means in a second lens means position for a display of the angularly displaced second picture with said second format in response to the positioning of the second picture in the second picture position.

In accordance with a preferred embodiment of the invention, the third means include means for transmitting movement of the second means to the lens means.

From another aspect thereof, the subject invention resides in apparatus for selectively viewing a first picture having a first format and a second picture having a second format, comprising, in combination, a first housing for releasably retaining either of the first and second pictures, a second housing having an aperture for viewing either of the first and second pictures, means on the first and second housings for mounting the first housing on the second housing for rotation of the first housing relative to the second housing to and from first and second angular positions, means for projecting either of the first and second pictures for veiwing through said aperture in the second housing, these projecting means including optical viewer means in the second housing and lens means for projecting either of the first and second pictures into the optical viewer means, and means coupled to the lens means and to the first and second housings for atuomatically positioning the lens means in a first position for a viewing of the first picture with said first format in response to rotation of the first housing to the first angular position and for automatically positioning the lens means in a second position for viewing of the second picture with said second format in response to rotation of the first housing to the second angular position.

In accordance with a preferred embodiment of the subject invention, the latter automatic positioning means include means for translating rotary motion of the first housing into translator motion of the lens means.

In accordance with a further preferred embodiment of the invention, the projecting means include a light source in the first housing.

BRIEF DESCRIPTION OF THE DRAWINGS

The invention will become more readily apparent from the following detailed description of preferred embodiments thereof illustrated by way of example in the accompanying drawings, in which like reference numerals designate like or functionally equivalent parts, and in which.

DESCRIPTION OF PREFERRED EMBODIMENTS

The subject invention may be practiced with various types of picture display apparatus. By way of example, and not by way of limitation, a preferred embodiment of a film viewer is shown.

Figure 1:
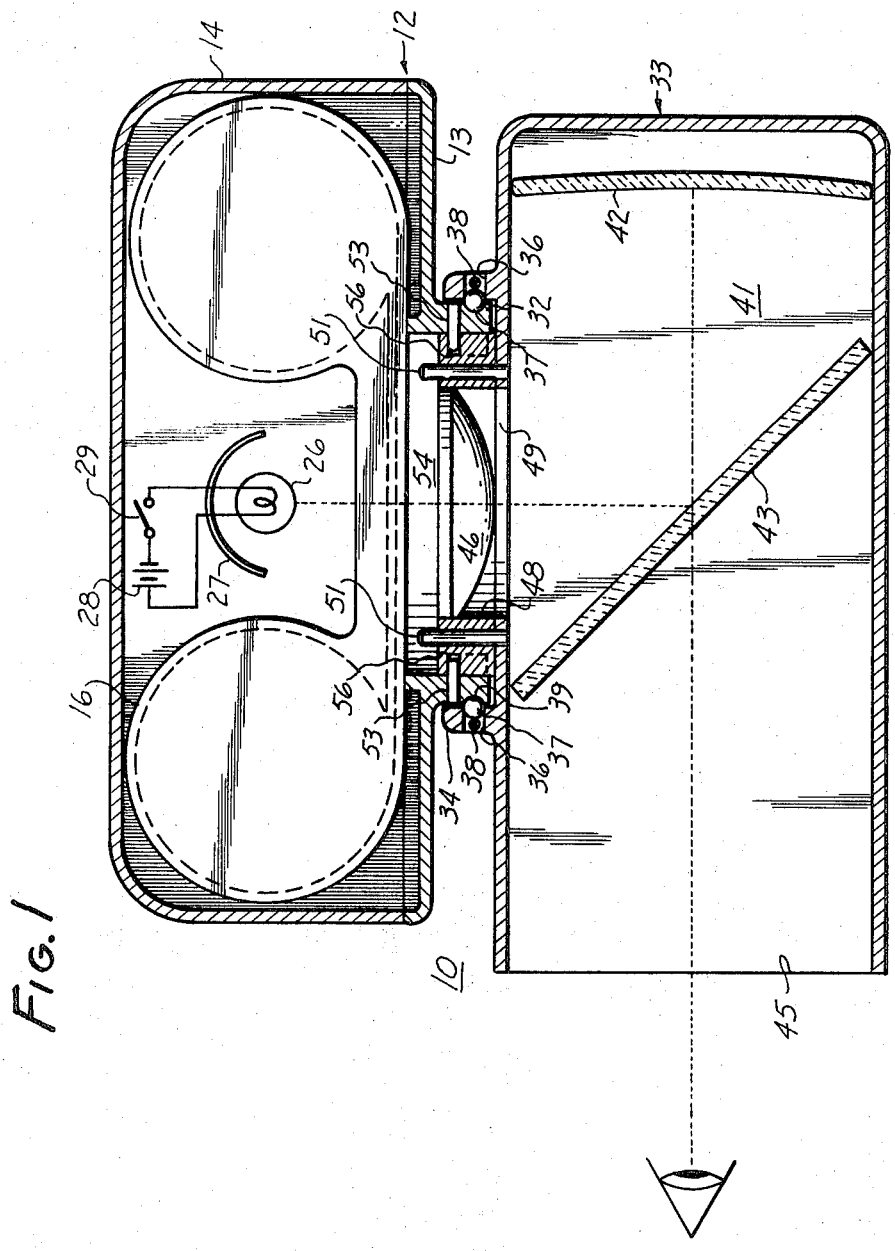
FIG. 1 is a longitudinal section through a dual-format film viewer in accordance with a preferred embodiment of the subject invention.
Figure 2:
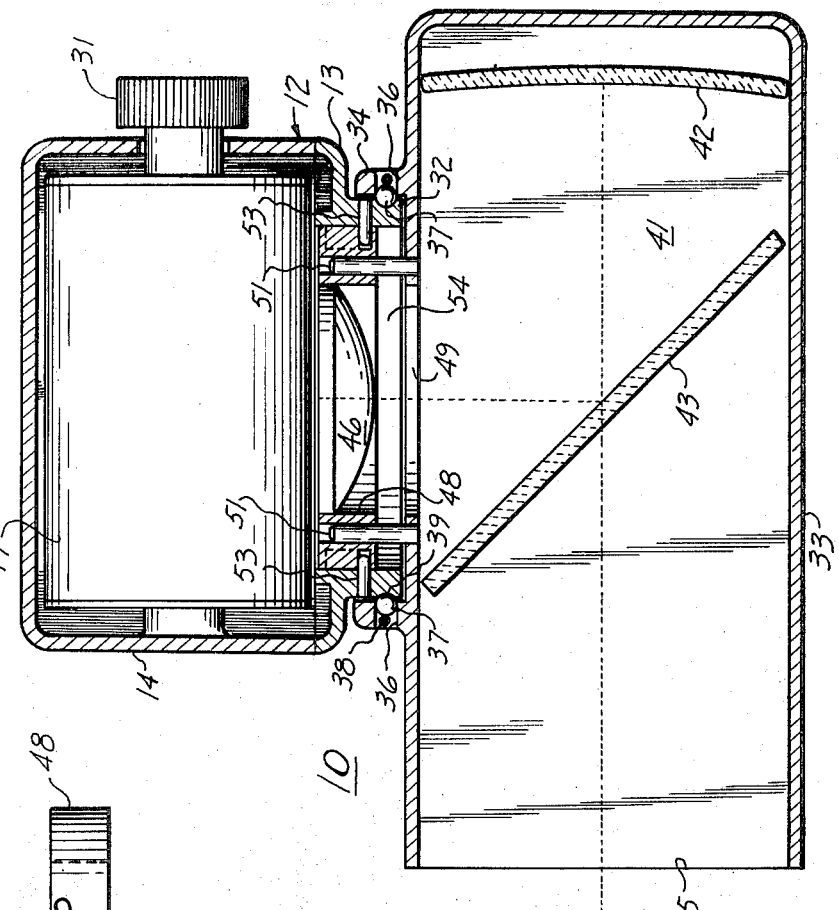
FIG. 2 is a view similar to FIG. 1, showing the viewer in a position for a different picture format.
Figure 3:
FIG. 3 is a side view of a part used in the apparatus of FIGS. 1 and 2.

The film viewer 10 shown in FIGS. 1 to 3 has a first housing 12 and a second housing 33. The first housing 12 has a base 13 and a removable top 14 for a releasable retention of films of different formats.

Figure 5:
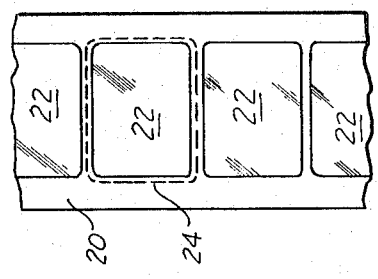
FIG. 5 is an elevation of a second film that may be viewed with the apparatus of FIGS. 1 and 2.

More specifically, the housing 12 is designed to releasably retain a cartridge 16 containing film of a first format and alternatively a cartridge 17 containing film of a second format. An example of film as contained in the cartridge 16 is shown as 19 in FIG. 4. FIG. 5 shows an example of film 20 which may be contained in the cartridge 17

Figure 4:
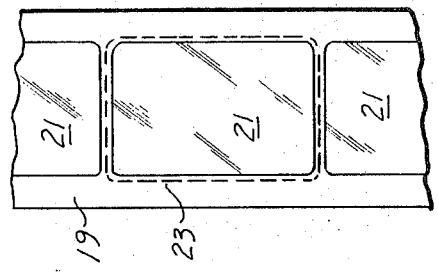
FIG. 4 is an elevation of a first film that may be viewed with the apparatus of FIGS. 1 and 2.

By way of example, the film 19 may be 35 millimeter film containing photographic still pictures 21 having a format of 36 by 24 millimeters. The film 20 may be 35 millimeter film containing photographic pictures 22 having a format of 24 by 18 millimeters. A dotted outline 23 in FIG. 4 illustrated a picture window that may be provided in the cartridge 16. Similarly, a dotted outline 24 in FIG. 5 illustrates a picture window that may be provided in the cartridge 17. These picture windows, as well as corresponding windows for projecting light through the pictures 21 and 22 in the cartridges 16 and 17, respectively, may be provided in a conventional manner.

As seen in FIG. 1, a projector lamp 26 with a reflector 27 is mounted in the housing 14. Conventional condensor lenses (not shown) may be employed if necessary for a uniform illumination of the film formats. Energization of the lamp 26 is typically effected from an internal battery 28 which is connected to the lamp 26 upon closure of a normally open switch 29 that may be positioned for actuation by the operator at any convenient location.

A knob 31 shown in FIG. 2 constitutes a means for advancing the film in either of the cartridges. Alternatively, a conventional lever-actuated film advance mechanism of the type used in still cameras may be provided at the housing 12. The film advance mechanism is not shown in detail herein, since its structure may be conventional and does not form part of the subject invention.

The base 13 of the housing 12 has an integral flange 32, and the lower housing 33 has an integral flange 34. The flanges 32 and 34 cooperate in providing for a mounting of the first housing 12 on the second housing 33 for rotation of the first housing relative to the second housing to and from first and second angular positions. To this end, the flange 34 has a plurality of bores, two of which are shown at 36, for accommodating a plurality of balls 37. A circular compliance spring 38 biases the balls 37 against the flange 32 of the housing 12.

The balls 37 ride in a circular groove 39 in the flange 32. In accordance with conventional practice, the groove 39 has detents in the form of spherical depressions (not shown) for releasably retaining the first housing 12 in the first position shown in FIG. 1 and alternatively in the second position shown in FIG. 2.

The lower housing 33 contains optical viewer equipment 41, including a concave mirror 42 and a semi-mirror or beam splitter 43 for a viewing of either of the images 21 and 22 through an aperture 45 in the housing 33.

The viewing system further includes a lens 46 for magnification of the illuminated film of either of the pictures 21 or 22. The beam splitter 43 reflects the projected light onto the concave mirror 42 which, in turn, reflects and provides additional magnification of the image which is viewed via the beam splitter 43, through aperture 45.

In the illustrated preferred embodiment, the lens 46 is located at the interface of the housings 12 and 33. In particular, the lens 46 is mounted in a circular lens holder 48. For instance, the lens 46 may be cemented to the lens holder 48 or may be held therein by a press-fit. In the illustrated preferred embodiment, the lens holder 48 has an aperture corresponding to the aperture 49 in the housing 33 through which the pictures are projected by the lens 46.

Two or more pins 51 are fastened to the housing 33 and extend through corresponding bores in the lens holder 48 to permit translatory motion of the lens and lens holder relative to the film 19 or 20 in the cartridge 16 or 17. Two or more pins 53 are fastened to the flange 32 and extend radially to a bore 54 in the housing 33, in which the lens holder 48 rides.

The pins 53 extend into angular slots 56 provided in the lens holder 48. One such angular slot 56 is shown in FIG. 3. Each angular slot 56 extends over a sufficient part of the circumference of the lens holder 48 to permit rotation of the housing 12 from the position shown in FIG. 1 to the position shown in FIG. 2 and vice versa.

Rotary motion of the housing 12 relative to the housing 33 is thus translated into translatory motion of the lens 46. More specifically, if the housing 12 relative to the housing 33 is in the position shown in FIG. 1, the lens 46 and lens holder 48 are in their lowermost position for a projection and viewing of the large format pictures 21 in the cartridge 16. If a viewing of the smaller format pictures 22 is desired, the film cartridge 16 is replaced by the film cartridge 17 containing the film 20 and the upper housing 12 is rotated to its second position shown in FIG. 2. During such adjustment of the housing 12, rotation of the lens holder 48 is prevented by the pins 51 attached to the housing 33. On the other hand, the pins 33, which rotate with the housing 12, bear pressure against the lens holder 48 in the slots 56 so as to move the lens holder to their closest proximity to the film 20 in the cartridge 17, for a projection and viewing of the small format pictures 22. The position of the lens 46 is automatically readjusted for a projection and viewing of the large format pictures 21 when the housing 12 is rotated back to the position shown in FIG. 1

In this manner, the lens 46 is automatically positioned in a first position, shown in FIG. 1, for a viewing of the large format pictures 21, and is furthermore automatically positioned in a second position, shown in FIG. 2 for viewing of the small format pictures 22. The automatic positioning to the first position is effected in response to rotation of the housing 12 to the first angular position shown in FIG. 2. On the other hand, the positioning of the lens in the second position is effected in response to rotation of the housing 12 to the second angular position shown in FIG. 2.

Rotation of the housing 12 in accordance with the subject invention has a further advantage in the case of formats of the type shown at 21 and 22 in FIGS. 4 and 5. In particular, the formats of the pictures 21 and 22 have similar aspect ratios. Accordingly, optimization of the use of available viewing area results if the film 20 is viewed in a position which extends at right angles to the viewing position of the film 19. In particular, movement of the lens 46 in accordance with the subject invention causes an overall change in magnification so that the two formats are nearly equal in size when viewed.

As far as modifications of the illustrated preferred embodiment are concerned, it will be recognized that the turret concept of the embodiment shown in FIGS. 1 and 2 also lend itself to a structure in which the lens 46 would remain stationary, while the housing 12 would move away from and toward the housing 33 when the housing 12 is rotated relative to the housing 33 in a first and in a second sense of rotation, respectively. To realize this embodiment, the lens 46 could be fitted to the housing 33 in the housing opening 49, pins of the type of pins 53 could be attached to the flange 34, and corresponding grooves of the type of grooves 56 could be provided in the flange 32. The balls 37 and spring 36 would then function as detent means, retaining the housing 12 in either of its two extreme positions.

By way of further modification, the mirror 42 could be rendered adjustable in response to rotation of the housing 12, either with or without a corresponding adjustment of the lens 46 or of the distance between lens 46 and film 19 or 20.

While such alternatives are workable, the embodiment according to FIGS. 1 or 3 is preferred for its greater effective range of accommodation of different film formats.

Further modifications and variations within the spirit and scope of the subject invention will become apparent from the subject disclosure to persons skilled in the art.

We claim:

1. Apparatus for selectively displaying a first picture having a first format and a second picture having a second format, comprising in combination:
   first means including lens means for projecting either of said first and second pictures and means for rendering said lens means translatorily movable along an axis in an optical path passing through said lens means;
   second means for selectively positioning said first and second picture, respectively, in a first picture position and in a second picture position angularly displaced relative to said first picture position in said optical path;
   third means for rendering said second means rotatable about said axis; and
   fourth means coupled to said lens means and to said second means for effecting translatory movement of said lens means in response to rotary movement of said second means, said fourth means including means for automatically positioning said lens means in a first lens means position for a display of said first picture with said first format in response to said positioning of said first picture in said first picture position and for automatically positioning said lens means in a second lens means poistion for a display of said second picture with said second format in response to said positioning of said second picture in said angularly displaced second picture position.

2. Apparatus as claimed in claim 1, wherein:
   said fourth means include means for transmitting movement of said second means to said lens means.

3. Apparatus as claimed in claim 1, wherein:
   said second means include means for positioning said second picture at right angles to said first picture position.

4. Apparatus for selectively viewing a first picture having a first format and a second picture having a second picture format, comprising in combination:
   a first housing for releasably retaining either of said first and second pictures;
   a second housing having an aperture for viewing either of said first and second pictures;
   means on said first and second housings for mounting said first housing on said second housing for rotation of said first housing relative to said second housing to and from first and second angular positions;
   means for projecting either of said first and second pictures for viewing through said aperture in the second housing, said projecting means including optical viewer means in said second housing and lens means for projecting either of said first and second pictures into said optical viewer means; and
   means coupled to said lens means and to said first and second housings for automatically positioning said lens means in a first position for a viewing of said first picture with said first format in response to rotation of said first housing to said first angular position and for automatically positioning said lens means in a second position for viewing of said second picture with said second format in response to rotation of said first housing to said second angular position.

5. Apparatus as claimed in claim 4 wherein:
   said automatic positioning means include means for translating rotary motion of said first housing into translatory motion of said lens means.

6. Apparatus as claimed in claim 4, wherein:
   said projecting means include a light source in said first housing.

* * * * *